June 5, 1956  W. OHLUND  2,749,019
BREAD TRAY CARTON AND THE LIKE
Filed May 19, 1954  3 Sheets-Sheet 1
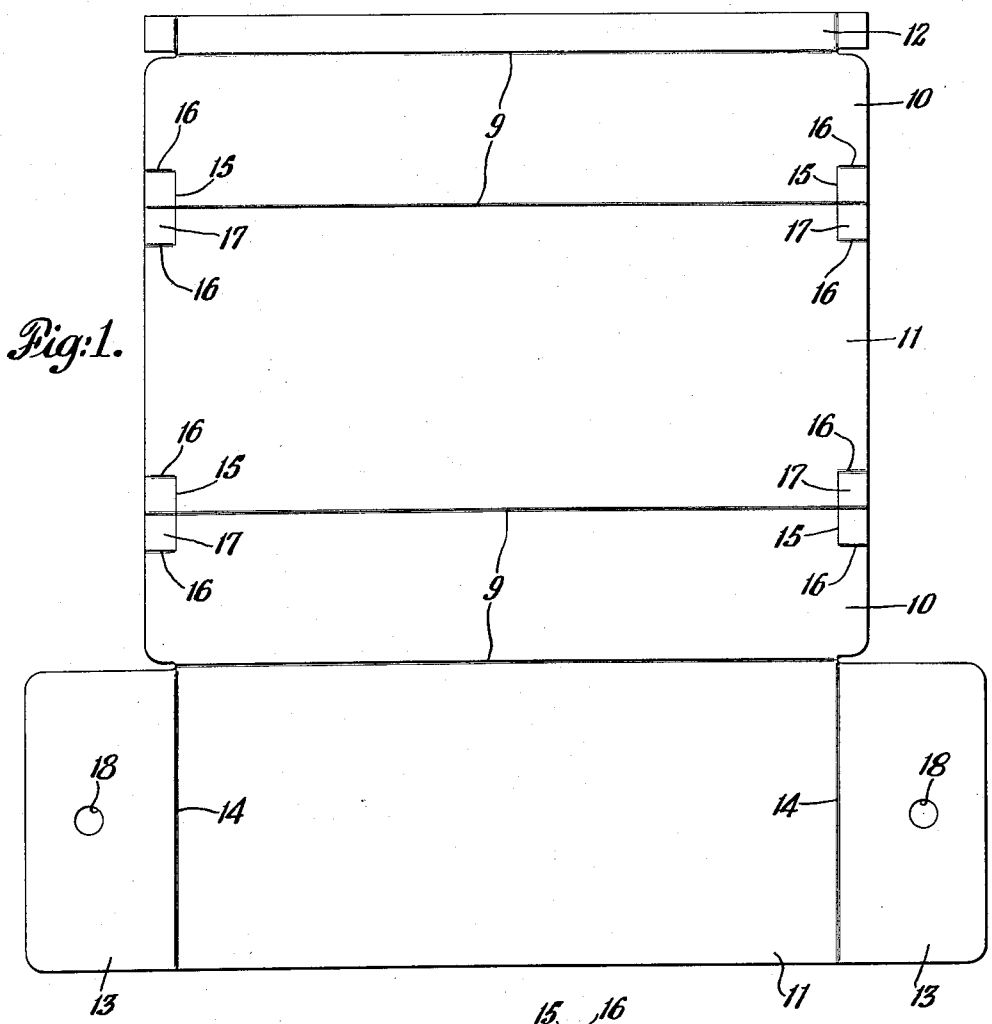
Fig:1.
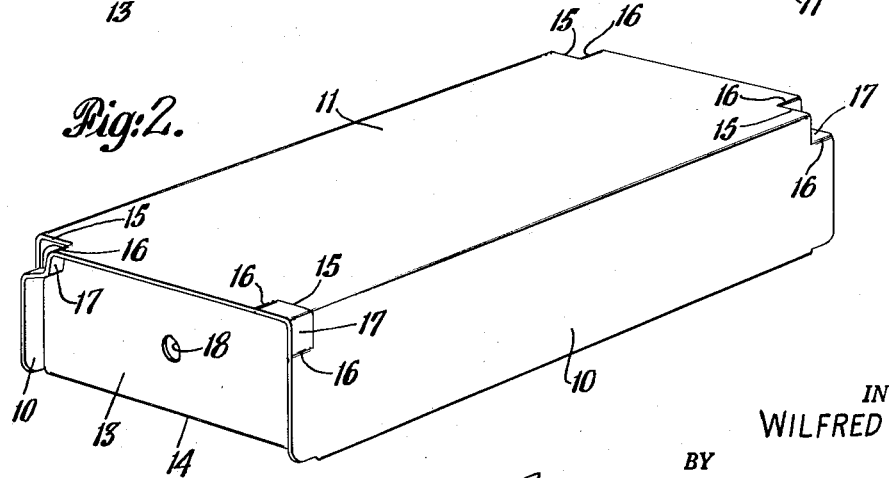
Fig:2.
INVENTOR.
WILFRED OHLUND
BY
ATTORNEYS June 5, 1956  W. OHLUND  2,749,019
BREAD TRAY CARTON AND THE LIKE
Filed May 19, 1954  3 Sheets-Sheet 2
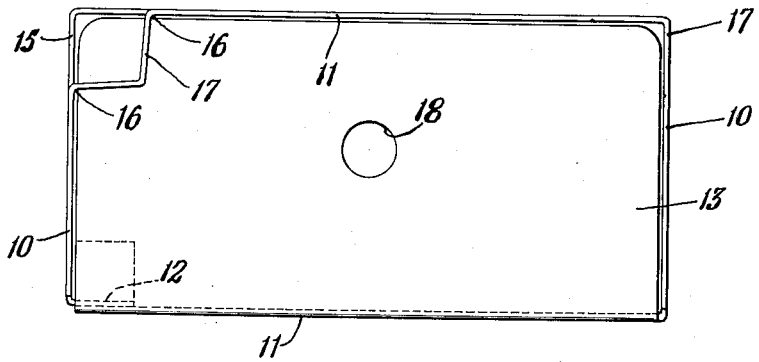
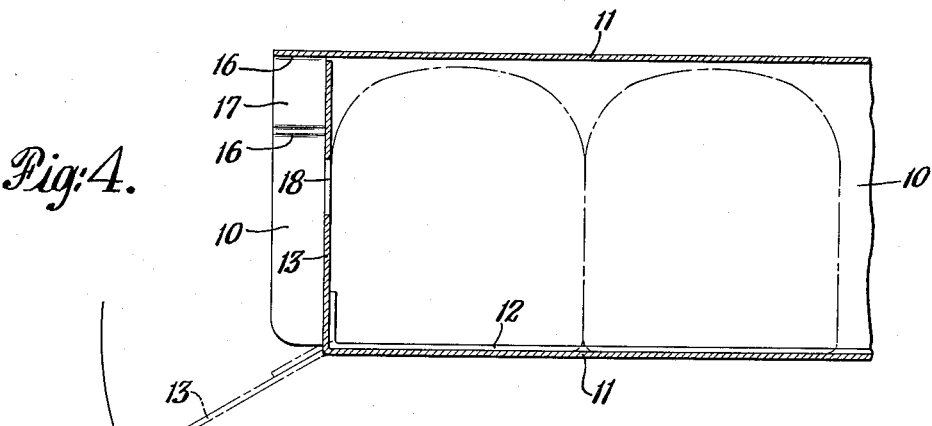
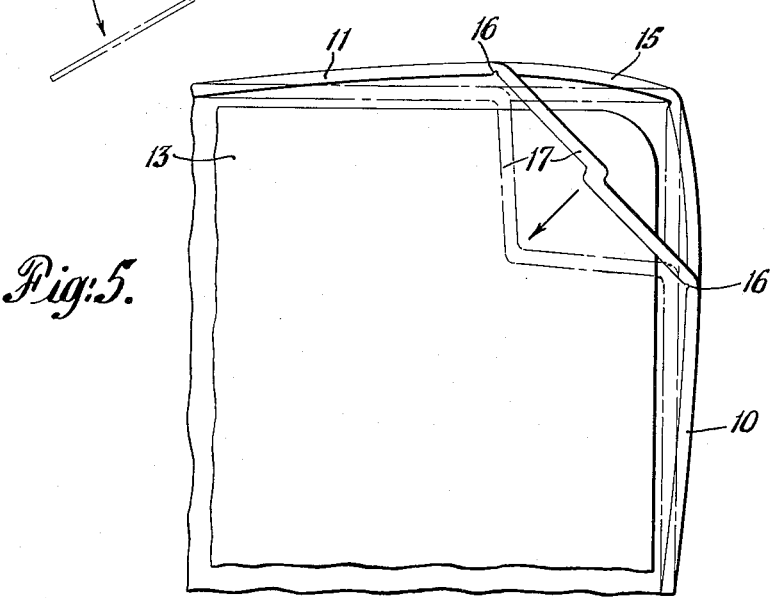
INVENTOR.
WILFRED OHLUND
BY
ATTORNEYS

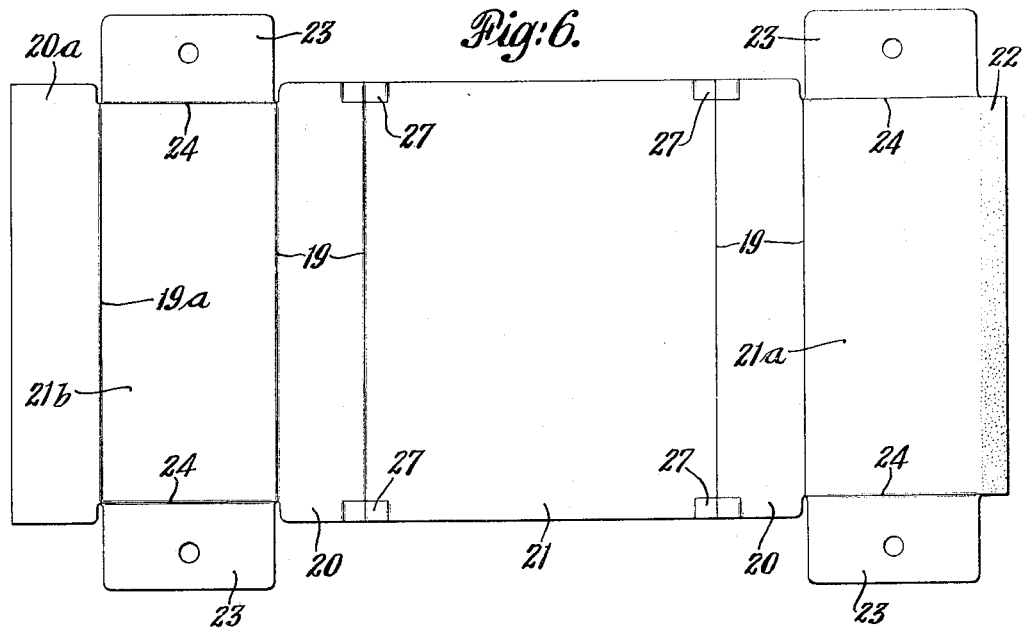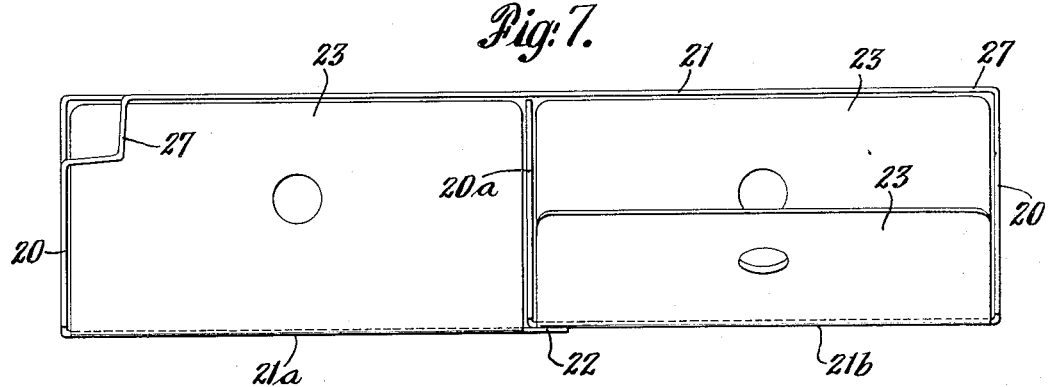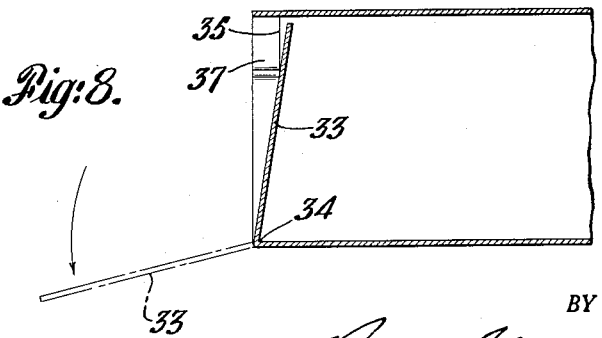

United States Patent Office 2,749,019
Patented June 5, 1956

2,749,019
BREAD TRAY CARTON AND THE LIKE

Wilfred Ohlund, Arlington, Mass., assignor to Robert Gair Company, Inc., New York, N. Y., a corporation of Delaware Application May 19, 1954, Serial No. 430,847

3 Claims. (Cl. 229—45)

The invention relates to paperboard cartons especially adapted for use as bread "trays" for the handling and transportation of loaves of bread from the bakery to retail stores or consumers.

A particular problem which it has been an object of my invention to solve is to provide a paperboard box which can be used in place of conventional wood trays long used in bakery delivery trucks, while retaining certain essential characteristics of the wood trays, for example: ease of loading, capacity of holding the loaves of bread side by side and resting on their bottoms, protected against squashing, capability of stacking, etc.

It has been proposed heretofore to use standard fibreboard shipping containers in which the loaves are carried on their ends instead of resting on their bottoms as in the wood trays. However, it has been found undesirable to carry the loaves on end because the bread is generally too soft to sustain its own weight in that position, so that the loaves will get out of shape during handling and trucking. Such containers also had other drawbacks, notable among which is the amount of time and labor required to get open the four cover flaps for loading of the container, to close the flaps, and finally to reopen them for unloading.

Summary

According to my invention there is provided a paperboard carton having two pairs of opposed wall panels, and a single hinged closure panel at one or both ends of the carton, this closure panel extending from one of the wall panels, such as the panel which forms the bottom of the carton and adjoining the latter along a transverse fold line, a cut line extending transversely across the longitudinal fold line between two adjoining wall panels near the end of the carton extending for a short distance into each of such adjoining wall panels. Longitudinal fold lines extending from the ends of the aforesaid cut line to the ends of the respective adjoining wall panels define an articulated corner strap adapted to be pressed inwardly to a position overlying a corner of the hinged closure panel to lock it in its closed position. The corner strap is held in its locking position by what may be described as a toggle action against the resilience of the paperboard stock. When the corner strap is pressed inwardly, the effect is to flex the adjoining wall panels outwardly until the articulated sections of the strap are in line, i. e. with the "toggle" at dead center. Once the toggle has passed this dead center position, it snaps into its final position to latch the end closure shut, the adjoining wall panels re-assuming their normal unflexed condition.

Preferably two such articulated toggle latches are used, one at each corner of the side of the carton which is opposite the hinged line of the closure.

This arrangement is one which makes it extremely easy to load the loaves by sliding them into the carton in their normal horizontal position. Then, in what is virtually a single operation, the loader pushes up the end closure and with the forefinger of each hand simultaneously snaps the corner straps into latching position. Unloading is equally simple. These and other objects will appear more fully in the description which follows.

Description

In the drawings wherein I have illustrated the best mode contemplated by me for carrying out my invention:

Fig. 1 is a face view of a paperboard blank from which my carton may be formed.

Fig. 2 is a perspective view of the assembled carton with the end closure latched in place.

Fig. 3 is an end elevational view of the same carton.

Fig. 4 is a detail view showing one end of the carton in central vertical longitudinal section.

Fig. 5 is an enlarged detail end view of one corner of the carton showing the latching action.

Fig. 6 is a face view of a blank for a modified form of carton.

Fig. 7 is an end view of the carton made from the blank of Fig. 6.

Fig. 8 is a detail view similar to Fig. 4 illustrating a further modification.

Figs. 1 to 5 inclusive illustrate my preferred carton construction for a single row of bread loaves. Figs. 6 and 7 illustrate an adaptation of this construction to a double carton, i. e. one which is designed to receive two rows of loaves.

Referring to Fig. 1, there is shown a paperboard blank having longitudinal score lines or fold lines 9 defining two pairs of opposed wall panels 10, 10 and 11, 11, and a glue lap 12. Closure panels 13, 13 extend from respective ends of one of the wall panels 11 and adjoin the latter along transverse fold lines 14, 14. Cut lines 15 extend transversely across the longitudinal fold lines 9 between adjoining wall panels 10 and 11, these cut lines extending for a short distance into each of the adjoining wall panels. Longitudinal fold lines 16 extend from the ends of cut lines 15 to the ends of the respective wall panels, and, together with the cut lines 15, define articulated corner straps 17.

The carton is assembled into flat-folded form by folding wall panel 10 with adjoining glue lap 12 flat against the adjoining wall panel 11. Then, glue having first been applied to glue lap 12, the remaining wall panel 11 (the lower one in Fig. 1) is folded over to bring its free edge in line with the fold line of the glue lap, and pressure applied to complete the gluing operation. The carton is now in the form of a flattened tube and is ready to be set up for use. This is accomplished by erecting the side walls 10 and closing one end of the carton by pushing the respective closure panel 13 into its vertical position or so that its upper corners come slightly beyond the cut lines 15 defining the inner edges of the respective corner straps 17. These straps are then pressed inwardly into positions overlying the corners of the closure panel to lock the latter in its closed position. The carton is now ready for loading, and after loading the other end is closed in the same manner as the first. If desired one of the corner straps can be omitted, relying on the latch at one corner for locking of the closure panel. Finger holes 18 may be provided in the closure panels 13 for convenience in reopening the carton.

From the foregoing description it will be understood that my invention comprises in its general arrangement a paperboard carton having two pairs of opposed wall panels 10, 10 and 11, 11, and a closure panel 13 at an end of the carton, the closure panel extending from one of the wall panels and adjoining the latter along a transverse fold line 14, a cut line 15 extending transversely across the longitudinal fold line 9 between two adjoining wall panels 10, 11 near said end of the carton at the side which is opposite said transverse fold line, the cut line 15 extending for a short distance into each of the adjoining wall panels 10, 11, longitudinal fold lines 16 extending from the ends of cut line 15 to the ends of the respective adjoining wall panels, the cut line and the fold lines extending from its ends defining an articulated corner strap 17 adapted to be pressed inwardly into a position overlying a corner of the closure panel 13 to lock the closure panel in its closed position, the corner strap being held in its locking position by toggle action against the resilience of the paperboard stock. In my preferred construction the articulated corner strap of the construction defined is provided at each of the two corners which are opposite the transverse fold line of the closure panel. Also, the transverse fold line 14 is offset from the end of the carton into substantial alignment with the cut line (or lines) 15 (see Fig. 1).

Referring to Fig. 5, I shall now describe the toggle action of the corner strap when it is operated in a manner which provides its latching function. With the closure panel 13 in its closed position, the corner strap 17 is pressed inwardly. The effect of this operation is to flex the adjoining wall panels 10 and 11 outwardly until the articulated sections of the strap 17 are approximately in line, this being the position shown in full lines in Fig. 5, i. e. with the toggle at dead center. As indicated by dot and dash lines in this view, once the toggle has passed this dead center position, it snaps into its final position to latch the end closure shut, the adjoining wall panels reassuming their normal unflexed condition.

Referring now to Figs. 6 and 7, I shall described my construction as adapted to the double form of carton. In this form the longitudinal fold lines 19 define two pairs of opposed wall panels 20, 20 and 21, 21 (a and b). The glue lap 22 is formed as an extension of panel section 21a without any fold line between. Fold line 19a defines an extension 20a of wall panel section 21b, this extension 20a being designed to form a median partition between the two sections of the carton.

Closure panels 23 extend from one of the wall panels 21, i. e. from the wall panel sections 21a and 21b respectively, and adjoin the latter along a transverse fold line 24. When the closure panels are erected at one end of the carton, their adjacent vertical edges serve to hold the median partition panel 20a in its erected position. The construction and operation of the corner straps 27 is the same as that of the corner straps 17 described in connection with the embodiment of Figs. 1 to 5.

Fig. 8 illustrates a further modification in which the transverse fold line 34 of closure panel 33 is in alignment with the end of the carton instead of being offset into alignment with the cut line 35 of the articulated corner srtap 37.

As used herein, and in the appended claims, the term "paperboard" is defined as including all of the paper mill products customarily employed in making folding boxes and/or shipping containers, for example, the materials commonly known by such names as "corrugated board," "fibreboard," "box board," etc.

The terms and expressions which I have employed are used in a descriptive and not a limiting sense, and I have no intention of excluding such equivalents of the invention described, or of portions thereof, as fall within the purview of the claims.

I claim:

1. A paperboard box having two pairs of opposed wall panels and a closure panel at an end of the box, said closure panel extending from one of said wall panels and adjoining the latter along a transverse fold line, a cut line extending transversely across the longitudinal fold line between two adjoining wall panels near said end of the box at the side which is opposite said transverse fold line, said cut line extending for a short distance into each of said adjoining wall panels, longitudinal fold lines extending from the ends of said cut line to the ends of the respective adjoining wall panels, said cut line and the fold lines extending from its ends defining an articulated corner strap, said box being formed of stiff fibreboard, box board, corrugated board or like heavy stock, and said fold lines being formed by scoring said stock to provide flexible hinged joints where the stiff sections of the articulated corner strap meet said respective wall panels and each other, said stiff articulated sections forming a toggle latch for repeated operation in locking and unlocking the closure panel, operable by pressing the latch inwardly into a position overlying a corner of said closure panel and again by pressing the latch outwardly from said position, the combined stiffness of said articulated sections and flexibility of said hinged joints enabling the toggle latch to repeatedly flex the adjoining wall panels outwardly until the articulated sections are approximately in line to pass a dead center position and be snapped into its locked (or unlocked) position upon return of said adjoining wall panels to their normal unflexed position.

2. A paperboard box in accordance with claim 1 in which an articulated corner strap of the construction defined is provided at each of the two corners which are opposite said transverse fold line.

3. A paperboard box in accordance with claim 1 in which said transverse fold line is offset from the end of the box into substantial alignment with said cut line of the articulated corner strap.

References Cited in the file of this patent

UNITED STATES PATENTS

| 1,168,565 | Rosenwald | Jan. 18, 1916 |
| 1,195,358 | Hullings | Aug. 22, 1916 |
| 2,076,375 | Krudener | Apr. 6, 1937 |
| 2,368,753 | Elliott et al. | Feb. 6, 1945 |

FOREIGN PATENTS

| 326,006 | Great Britain | Mar. 6, 1930 |